United States Patent
Westick

(10) Patent No.: US 9,462,357 B2
(45) Date of Patent: Oct. 4, 2016

(54) AUTOMATED ASSET TRACKING SYSTEM AND METHOD

(71) Applicant: Michael Westick, Huntertown, IN (US)

(72) Inventor: Michael Westick, Huntertown, IN (US)

( * ) Notice: Subject to any disclaimer, the term of this patent is extended or adjusted under 35 U.S.C. 154(b) by 0 days.

(21) Appl. No.: 14/024,033

(22) Filed: Sep. 11, 2013

(65) Prior Publication Data
US 2015/0070191 A1 Mar. 12, 2015

(51) Int. Cl.
*G08C 19/22* (2006.01)
*H04Q 9/00* (2006.01)
*G06Q 10/00* (2012.01)
*A01K 5/02* (2006.01)
*G06F 17/50* (2006.01)
*G06F 19/00* (2011.01)
*H04B 5/00* (2006.01)
*H04B 7/00* (2006.01)

(52) U.S. Cl.
CPC ............ *H04Q 9/00* (2013.01); *H04Q 2209/40* (2013.01)

(58) Field of Classification Search
USPC ............ 235/435–495; 600/561; 455/41.1–45
See application file for complete search history.

(56) References Cited

U.S. PATENT DOCUMENTS

| | | | | |
|---|---|---|---|---|
| 7,267,270 B2 * | 9/2007 | Hopwood | .............. | G06Q 10/08 235/375 |
| 8,002,180 B2 * | 8/2011 | Harper | .................. | G06Q 10/00 235/375 |
| 2003/0227392 A1 * | 12/2003 | Ebert | ..................... | G06K 17/00 340/8.1 |
| 2006/0022800 A1 * | 2/2006 | Krishna | ............... | G06K 7/0008 340/10.2 |
| 2007/0239569 A1 * | 10/2007 | Lucas | .................... | G06Q 10/08 705/28 |
| 2007/0285241 A1 * | 12/2007 | Griebenow | ............ | G06Q 10/08 340/572.1 |
| 2008/0125965 A1 * | 5/2008 | Carani | .................. | G07C 5/008 701/408 |
| 2008/0228346 A1 * | 9/2008 | Lucas | .................. | G06Q 10/087 701/31.4 |
| 2009/0216775 A1 * | 8/2009 | Ratliff | ..................... | G06Q 10/08 |
| 2013/0024301 A1 * | 1/2013 | Mikan et al. | .................. | 705/16 |
| 2014/0159914 A1 * | 6/2014 | Heller | ..................... | H04Q 9/00 340/870.02 |

* cited by examiner

*Primary Examiner* — Firmin Backer
*Assistant Examiner* — Jerold Murphy
(74) *Attorney, Agent, or Firm* — Jacque Wilson; Carson Boxberger LLP

(57) ABSTRACT

A system and method is provided for automatically tracking the presence or absence of multiple assets within a stationary or mobile location and differentiating among groups of assets or individual assets belonging to one or more parties within a single stationary or mobile location using multiple data correction and filtering techniques to provide accurate information to a plurality of users and/or service providers.

7 Claims, 3 Drawing Sheets

AUTOMATED ASSET TRACKING SYSTEM AND METHOD

BACKGROUND

1. Technical Field

The present invention relates generally to automatically tracking the presence or absence of multiple assets at a stationary or mobile location and differentiating between individual assets or groups of assets owned by one or more parties at a single stationary or mobile location. More particularly, the present invention is especially useful to tracking tools used in the reclamation business such as humidifiers, air movers, thermometers, humidity detectors, gauges, and the like by combining multiple positioning techniques and mathematical algorithms.

2. Related Art

Position or location tracking is a crucial component of inventory or resource management systems. Location tracking systems can employ a variety of real-time positioning sensors that continuously or periodically provide position data for tracking the location of resources. These systems commonly acquire the locations of vehicles, equipment, or inventory based on principles of either triangulation or proximity with respect to known locations determined from sensors. Typical sensors used include Global Positioning System (GPS), Differential Global Positioning System (DGPS), Integrated Differential Global Positioning System and Inertial Navigation System (DGPS/INS), Real Time Locating System (RTLS), RTLS/GPS, RTLS/INS, transponders and ultra wideband locating systems.

Limitations in physics, however, generally prevent real-time positioning systems from achieving 100% reliability or accuracy. Examples of those limitations with respect to radio-wave positioning include obstacles blocking line of sight position signals, or signals reflected from nearby surfaces (multi-path). Further practical limitations in sensor technologies include electromagnetic and other inherited noise and biases in measurements, as well as a poor signal to noise ratio resulting from environmental interference sources. These limitations result in common positioning errors such as inaccuracies, loss of position, or location drifts causing erroneous position or inventory data.

Even when more accurate real-time position data can be determined through a combination of sensors, data and methods, these solutions do not solve another important problem in the inventory and resource tracking environment, namely what happens when at least a portion of the real-time position sensor data is inaccurate, missing or is lost. As a simple example, a real-time positioning system based on an expensive integrated GPS/INS solution can drift away from the true positions when the system enters an area covered by less than four GPS satellites for a long period of time. In a typical inventory tracking environment, inaccurate location measurements, if not corrected in time, can propagate into widespread inventory location errors. This occurs especially when tracking the position of containers or vehicles in a warehouse, container yard, or rail yard where tracking signals are often blocked. Resultant errors then require manual correction. The correction of the corrupted inventory database can create delays and often expensive corrective measures in resource management and inventory controls. Additionally, present systems lack the ability to expand to differentiate between objects or assets owned by sometime a large plurality of different parties at a single job site or location.

It is desirable, therefore, to provide a system and method that increases the accuracy of monitoring the real-time position of an object, especially as such position information can tell a user or system provider that an asset is or is not present a particular location or job site. It is further desirable to improve the accuracy of inventory location monitoring when one or more sensors, such as a GPS sensor, is unavailable or highly inaccurate due to noise. It is also desirable to track assets inexpensively, accurately, and automatically (without human involvement), and to differentiate between ownership of multiple assets by a single system within a single stationary or mobile geographic location.

The present invention relates generally to tracking systems for tracking the location of valuable materials, persons, objects, and more particularly, but not limited to, the tracking of tools or other assets through existing cellular network infrastructure, the global positioning system (GPS), WiFi networks, WiMax networks, and the like. The invention further relates to location and tracking systems and algorithms using a combination of directional vectors and signal strength estimates and location identifiers that are based on radio frequency transmissions. The invention also provides a system for asset tracking that is more prone to providing accurate and useful data to users and service providers.

There are earlier location systems which make use of the constellation of global positioning satellites orbiting the earth. Such systems range from navigational aids to tracking devices. For example, there is a vehicle tracking and security system that allows immediate response in case of vehicle theft, an accident, vehicle breakdown, or other emergency. Guardian and tracking functions are provided through mobile units installed in hidden locations in vehicles to be monitored. The mobile units communicate with a control center. Preferably, the mobile unit provides vehicle theft and intrusion protection using an in-vehicle alarm and security system linked to the control center by a transceiver in the mobile unit. In these systems, a keypad or other human interlace device is typically provided, allowing a vehicle driver or occupant to actively signal the control center that a particular type of assistance is needed. The vehicle's location may be automatically transmitted to the control center along with any automatic alarm signal or manually entered request, the location being precisely determinable anywhere in the world through use of Global Position System (GPS) information. The system provides continuous monitoring of a large number of vehicles for a broad range of status and emergency conditions over a virtually unlimited geographic area, also allowing manual communication of requests for assistance to that specific location. A limitation of such systems however, is the requirement of human activity to provide information to the system.

Another example of the use of GPS to track the location of an automobile is an automatic vehicle location system that includes a radio positioning system receiver which receives GPS radio signals and includes a two-gimbaled gyroscope, which is used by a dead-reckoning positioning system. A controller determines position based upon the radio positioning system when the radio signals are available and upon dead-reckoning when the radio signals are not available. The dead-reckoning process is based upon a compensation factor, which is established in response to data received from the radio positioning system. The compensation factor acts as an adjustment to an inner gimbal angle to compensate for a minor drift away from level by the inner gimbal. The use of gyroscopes, however, makes this an expensive and less robust system.

A further example is a method for detecting the position of a moving body in which the position of a moving body such as a vehicle can be detected with a high degree of precision. It is possible to perform data communication using radio waves between radio base stations and a vehicle capable of movement. Precise positions are stored in advance in the radio base stations. The radio base stations also include radio wave clocks that keep a common time. The radio base stations transmit radio waves containing this time information. The vehicle receives these radio waves and determines the difference between the received time information and the time provided by a clock in the vehicle, in order to detect the current position of the vehicle by calculating the distances between the vehicle and each of the radio base stations. Furthermore, it is also possible for the position of the mobile station to be calculated using a combination of information from the fixed station and information from GPS satellites. By employing this type of structure, it is possible to calculate the position of the mobile station even when it is not possible to calculate the position of the mobile station using the fixed stations alone or GPS satellites alone. Therefore, it is possible to find the position of the mobile station more accurately than when a conventional method is used.

There also exists a tracking device configured to resemble a stack of currency and represents a system for use in catching thieves. The device relates to the electronic tracking of cash stolen from a bank or other institution via an electronic signaling device placed within a stack of currency that transmits location information to the authorities as the cash is moved from location to location. The tracking device allows law enforcement officers to electronically monitor money stolen from a bank. The tracking device is sized to fit within a stack of currency in a teller's drawer or a bank's vault. When the tracking device is activated, it transmits a beacon signal that continuously runs for the duration of the battery. Thus, the tracking device would automatically send a signal to either fixed monitoring stations, such as antenna located on tall buildings, or to mobile monitoring stations, such as helicopters and/or police cars, allowing for continual tracking of the thief in possession of the stolen money. By knowing the location of the money, the police can track and apprehend the perpetrators. It is designed to be a circuit card smaller than a dollar bill and thin enough to be concealed between two sealed bills, thereby allowing it to be placed into a stack of money undetected. Further, the device is flexible and is able to be waterproofed, which will have no effect on its ability to be continually tracked, but would prevent someone from shorting out the device in liquid. Alternative embodiments allow variations of the tracking device to be placed within other objects of value. An alternative embodiment allows the tracking device to be automatically activated when it is taken past a certain point, e.g., an electronic fence, from where it is stored.

Furthermore, there are tracking systems for tracking the location of stolen articles, and more particularly, to disguised currency bundles for aiding law enforcement officials in apprehending thieves and recovering stolen monies. Such tracking is tracked by a tracking agency, which agency may work in concert with a law enforcement agency. In other situations, the functions of a tracking agency are undertaken by the law enforcement agency itself. Such system may include a security pack for assisting in the recovery of stolen monies, which includes a housing disguised as a bundle of currency bills, but containing a GPS receiver for receiving GPS signals from overhead satellites combined with a cellular phone transmitter (module), a microprocessor, antennae, and a battery. Following a bank robbery, the microprocessor activates the cellular phone transmitter to dial the telephone number of a central monitoring station. The microprocessor obtains location data from the GPS receiver and transmits the location data, along with identification information, to the central monitoring station. The security pack may also include a separate, conventional RF beacon transmitter for allowing authorities to home-in on the security pack within a large building or other structure, either after the GPS signals are lost, or after the location of the security pack is localized to a specific area or building.

All of the devices described above are implemented, or require for implementation, access to GPS or a custom radio network of receivers. This is an expensive requirement, increasing overall costs and the size of the devices. There is thus a need for a smaller, less expensive solution to tracking and aiding law enforcement officials in the recovery of lost or stolen articles or missing children while utilizing existing cellular telephone network infrastructure.

In accordance with the present invention, there is provided a system and method of determining whether a tagged asset is within or without of a stationary or mobile job site. Moreover, the present invention provides a system and method of determining the ownership of each asset at such a location. The present invention further provides a system and method for tracking the time assets or used and coordinating information for servicing, replacing, or adding assets to a user's inventory or a at a job site.

In one embodiment, updated location data is periodically received and communicated to the tracking service system, in order to generate updated geographic location data. The geographic location data is then communicated to a desired user, allowing the updated images representing the location of the asset to be viewed. In a preferred embodiment, a secondary tracking signal is received from a radio-frequency transmitter associated with the selected asset. The secondary tracking signal is then communicated to at least one associated tracking vehicle. This embodiment further includes the receiving tracking vehicle data from each associated tracking vehicle, which vehicle tracking data represents tracking vehicle location, tracking vehicle direction, tracking vehicle speed, or signal strength of a vehicle's received secondary tracking signal. The tracking data is then communicated to the security or other monitoring agency to allow for the viewing of updated images representing the location of each tracking vehicle.

Still further, in accordance with the present invention, there is provided an asset tracking management system and method. Device data is first received, representing properties of a plurality of asset tracking devices. The device data, representing the properties of the asset tracking devices is then displayed. Event data is then received, representing a tracking event associated with one of the asset tracking devices. This event data, representing the tracking event, is subsequently displayed. Device service data representing the maintenance history of the asset tracking devices is received and then displayed. Tracking data is then received, representing a temporal property corresponding to the tracking event. The tracking data corresponding to the temporal property is then displayed.

In a preferred embodiment, the device data includes identification data uniquely associated with each of the plurality of asset tracking devices, and asset association data, linked to device identification data, representing a particular asset associated with each respective device of the plurality. The event data associated with each event includes a unique event identifier associated with the event, and location data representing a location of an asset associated with the event. The device service data suitably includes data representative of an installation date of the device, and data representing a service period for the device.

Still further in accordance with the present invention, there is provided an asset tracking system and method. Location data is periodically received representing an updated location of a tracking device associated with an asset. Map data is then received and a map area is displayed, which map area is inclusive of the location. The map is periodically updated in accordance with newly acquired location data. A user specifies a desired scale level for the displayed map and the user's input is thereafter received, selectively scaling in and scaling out of the displayed map. In addition, input from the associated user specifying a display of historic location data is received, as well as means for displaying historic and updated location data in accordance with received user input.

In a preferred embodiment, data representing at least one of speed and velocity of the tracking device is received and an indicator is displayed, the indicator being of at least one of speed and velocity of the tracking device in accordance with received data.

Further in accordance with the present invention, there is provided a system and method for asset tracking. Notification data is received, representing the commencement of an asset tracking operation during which a selected asset is tracked. A tracking elapsed time is then tracked and associated with the asset tracking operation. Event data is then received, representing a triggering event associated with the tracking operation.

Still further in accordance with the present invention, there is provided a system and method for asset trucking. An identifier, representing at least one tracking event, is received and subsequently displayed. Date data, representing the at least one tracking event, is received. The date data, representing the tracking event, is then displayed. Data representing a temporal property associated with the at least one tracking event is received and displayed. Event data, corresponding to the at least one tracking event, is received. The event data is then displayed, corresponding to the at least one tracking event.

Still other aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

SUMMARY

In one embodiment, the present invention provides users with the location of assets or equipment on a map. To accomplish this functionality, objects or assets are tagged with active radio frequency (RF) devices that emit a signal or beacon. Transponders are aware of tags in their vicinity and report this to a central location. This information can then be displayed in a desired manner on a handheld or other human readable device, such that the tagged object or asset can be shown geographically. Additionally, texts can be sent to a desired location for GPS navigation or mapping, for example, street addresses or GPS coordinates.

In another embodiment, the present invention can determine whether an asset is at a job, in a vehicle, or at another location such as in a warehouse. By having such information, users of the present invention can determine what equipment is available for use on other jobs or when additional assets are needed. Transponders can be named or otherwise marked so that warehouses, locations, and asset owners can be identified.

In still another embodiment, the present invention can alert users about whether tagged assets (such as reclamation tools) have been left behind unintentionally. Tags that should be but are not in contact with transponders are visible to the user. Anyone with access to the system can find this out and, if necessary, take action. The system detects when tags from a finished job are left behind and sends a notification (text message, etc.) to desired parties. The present invention employs software such that tags for different tools have differing reporting rules. In the example of reclamation tools, some equipment (wands for example) should not ever be left behind at a job site whereas other equipment (air movers) will be.

Equipment brought to the site is compared to a list or database (for example one contained in software on a central CPU or local CPU) of equipment that should have been brought. When tagged equipment is loaded and taken to the job site, a view shows a list of tagged equipment that made it into the vehicle and/or to the jobsite. The software of the present invention then compares this list to his expectations and determines whether equipment was left behind that is or is likely to be needed on a particular job site.

In order to inform users of the present invention about assets (tools) left behind at a warehouse or job site, the system detects when tags from a started job are left behind and sends a notification (text message, etc.) to a user.

In yet another embodiment, the present invention is adapted to find lost or misplaced transponders. Powered transponders are found by looking for an abandoned one using the map. It may be in the warehouse, or it may have been left at a job site. Transponders are tagged and tracked in the same way as other assets.

In yet another embodiment, the present invention provides users with information about where "lost" equipment is located. Equipment that has not been detected and reported by a transponder for a long time will be shown as "out of contact". Map indicators are different for equipment that is out of contact. The present invention further provides for human readable devices having a view that can be filtered or sorted by contact status. In addition, the present invention provides users with map data and/or sorted, filtered lists to view the last known location of equipment.

In yet another embodiment, the present invention also provides users with information on virtual or mobile job sites. For example, the present invention provides information to users on where vehicles are located. This information can be used to keep track of employees and dispatch service vehicles based on proximity to job sites. Service vehicles will either have transponders or their own tags. These are tracked in the same manner that other transponders and tagged equipment are tracked.

In still another embodiment, the present invention stores a history of what vehicles are being used and correlates equipment events with employees. Tagged employees or tools are also tracked. Vehicle usage is determined by examining manual correlation of vehicle transponder and employee or tool tag histories.

Tags are carried with employees or on equipment that the employee uses (clip boards, for example). Vehicles and job sites have transponders that can detect these tags. Employee tags have been named by the user to tell them apart from equipment. Employee "assets" are found by searching, filtering, sorting or other means. Employee assets are selected. Asset history views are displayed for the employee assets. Detection (collocation) by vehicle or site transponders is shown. The user infers vehicle usage, whether the employee was at the job site when expected, etc.

In yet another embodiment, the present invention provides users with the ability to filter equipment information based on whether it is owned or loaned/rented to another party. Filters, sorting or other mechanisms are used to identify and report on lent assets.

Embodiments of the present invention can also store temporal data of asset usage for billing, maintenance, replenishment or other purposes. From maps, searches or other views specified elsewhere, users can determines the job sites of interest and requests a "job site equipment usage" view for them. For example, a "job site equipment usage" view shows each piece of equipment that was present at the site and the total time that each piece was at the site. The view also shows the total for each equipment type for each site.

If multiple sites are involved the user infers which sites are related and manually sums equipment times. Unplanned power cycles or movement and the use of multiple transponders at a site might create multiple job sites that are conceptually the same site for the purposes of billing.

The present invention further comprises means to assign an asset type to assets for the purposes of creating additional reports or filtering usage information in greater detail.

The present invention also provides a means for a user to generate reports for utilization of groups of assets. For example, a user may wish to determine a percentage of air movers used over the last 90 days. Thus, an asset utilization view is available. It is organized by asset type and shows estimated utilization for each asset and a roll up (sum) by asset type. Using a menu, button or other mechanism, ask to display the "asset utilization" view.

The present invention can also keep track of asset usage and alert users when the usage of a particular piece of equipment exceeds a certain number of hours. Such information is useful for billing and scheduled maintenance purposes. An asset will be "in stock" if it is not at a job site, has not been lent, and has been communicative enough so that it is not considered out of contact for this purpose. The system periodically (perhaps once an hour) determines which equipment is "in use" and adds time to the "total time in use" accumulators for that equipment.

The present invention can additionally set inventory thresholds to alert users when a particular type of asset is getting low. The system watches inventory levels and alerts the user of low inventories when applicable. The system watches status reports and classifies assets as either "in stock" or "out of stock". An asset will be "in stock" if it is not at a job site, has not been lent, and has been communicative enough so that it is not considered out of contact for this purpose. The system periodically checks "in stock" levels against those set by the user. This could occur any time a status arrives, or at a timed interval. The system sends alerts when applicable.

In still other embodiments, the present invention provides means for users to add notations to assets and for users to be alerted when an assets is moved outside a specific geographical location.

BRIEF DESCRIPTION OF THE DRAWINGS

The present invention is further described herein with reference to the following figures, wherein like reference numerals represent like elements.

It is to be understood that the figures and descriptions herein are descriptive and illustrative of embodiments of the present invention, but these figures and descriptions are not meant to be exclusive or limitations on the claims herein.

DETAILED DESCRIPTION OF THE EMBODIMENTS

Figure 1:
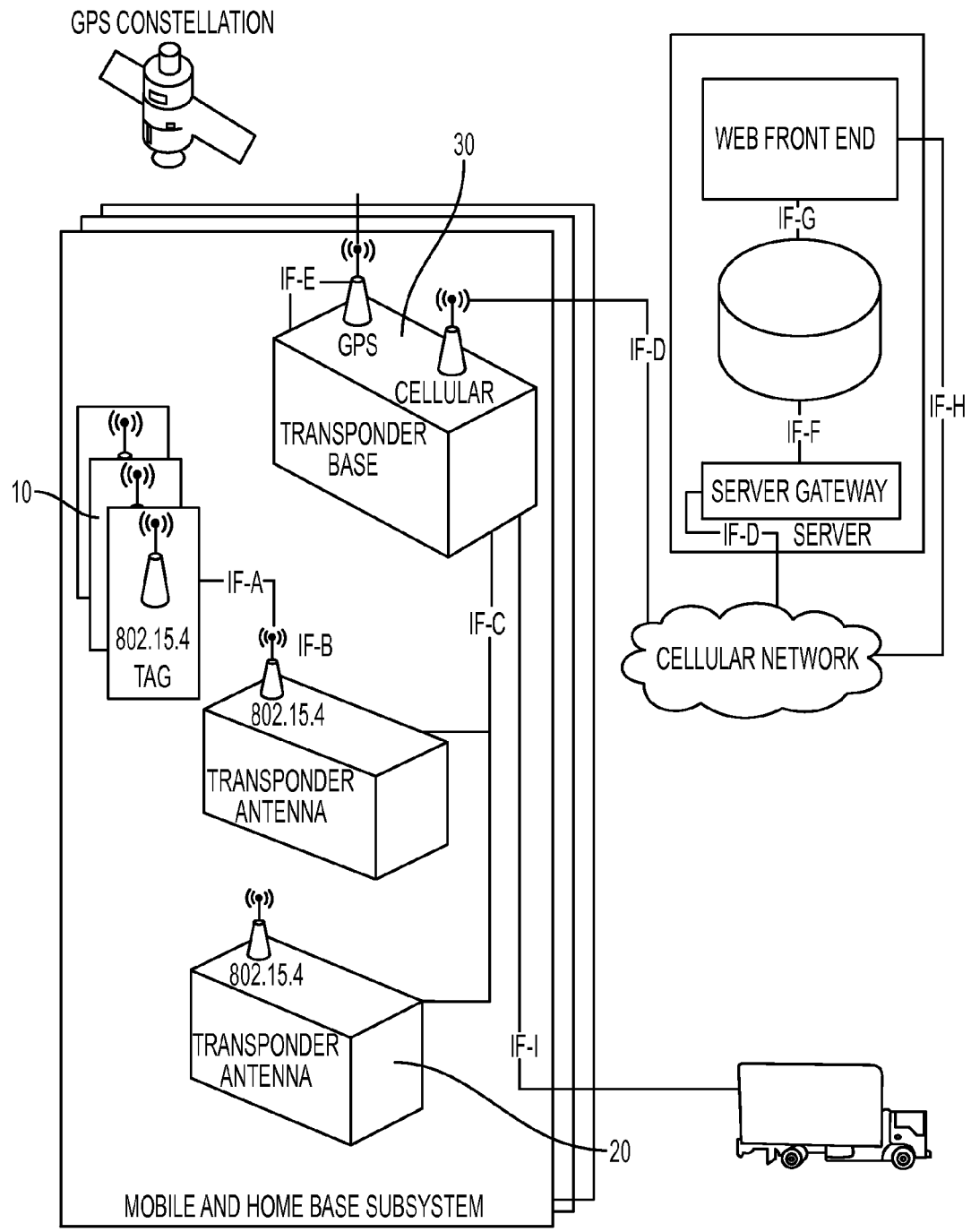
FIG. 1 is a functional block diagram illustrating an asset tracking system in accordance with the present invention.

Referring first to FIG. 1, there is shown block diagram illustrative of several physical embodiments of the present invention. As shown in FIG. 1, the present invention is comprises a system and method of tracking valuable assets, especially tools for reclamation projects. Such tools include, for example, air movers, dehumidifiers, temperature and humidity measuring devices, vacuums, etc. However, persons of skill in the art will appreciate that the present invention can be used to track any valuable asset, including tools, vehicles, people, and other physical items.

Referring again to FIG. 1, the present invention is useful in tracking a plurality of assets. In an exemplary embodiment, each asset has at least one tag (10) physically attached to it. Each tag (10) broadcasts a beacon to be received by a transponder antenna (20). Each tag (10) is a small, ruggedized, active RF device that sends periodic beacons that can be used to determine the presence (and absence) of the Tag by receiving equipment.

Tags (10) can also be outfitted with sensors that allow sensor data to be communicated as part of the beacon, thus enabling remote monitoring of the physical surroundings of the Tag. Tags use an 802.15.4-based communication mechanism to announce themselves. In one exemplary embodiment, A Texas Instruments system-on-a-chip is used on both the Tag and the Transponder Antenna to send/receive the Tag's beacons. Although radio protocols can support dynamic mesh networking, the protocol is simply being used as a way to announce the presence of Tags to the Transponder Antennas.

A Tag shall announce itself to any listening Transponder Antenna using the following paradigm:

Approximately every 20 seconds, send 3 beacons within 5 ms at +7 dBm.

Collision avoidance shall be employed with the possibility of not being able to send any beacons within 5 ms.

The next wakeup shall be scheduled using a random number such that the period is 20 seconds, plus up to 5 s. The granularity of the delta shall be as fine as reasonably possible.

In one exemplary embodiment, channel 14 (2420 MHz) is being used to transmit all Tag (10) beacons. This has been chosen to attempt at avoiding channels commonly used by 802.11g/n WiFi equipment.

Figure 3:
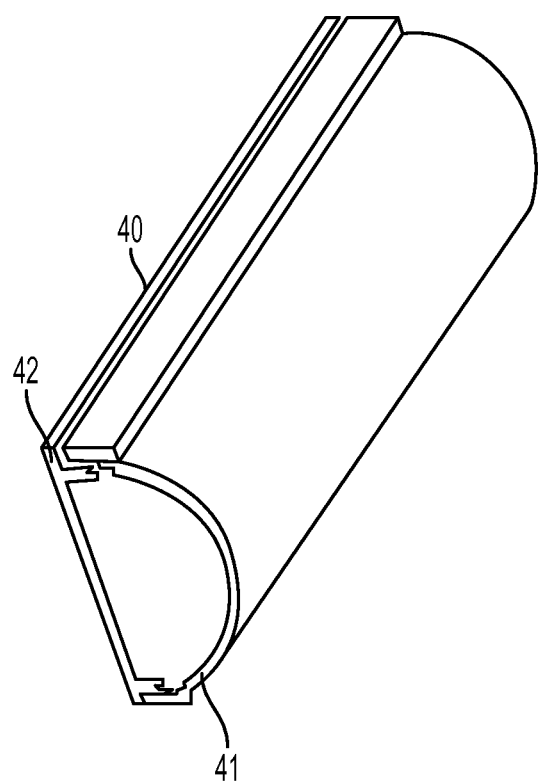
FIG. 3 is an embodiment of a tracking device enclosure according to an embodiment of the present invention.

Referring now to FIG. 3, there is shown a first embodiment of an enclosure (40) for a tag (10). Enclosures (40) are used to protect tag (10) from damage and to assist in attaching tags (10) to desired assets. As shown in FIG. 3, enclosure (40) is preferably constructed of a durable, corrosion resistant, low conductivity, material such as a thermoplastic or thermoset polymer.

Enclosure (40) generally comprises a base (41) and a top (42). Together top (41) and base (42) provide a complete surrounding for tag (10). It will be understood by those of skill in the art that enclosure (40) may be of any convenient shape, size, or material, as long as tag (10) is protected from the elements while maintaining its functionality.

In the exemplary embodiment of FIG. 3, enclosure (40) comprises a snap-fit connection for releasably enclosing top (42) upon base (41). Of course, top (41) and base (42) may be releasably sealed via any mechanical means, such as snap fit, tabs and grooves, pins, etc. In FIG. 3, enclosure (40) comprises a dome shape, which provides additional protection against blunt forces that tags (10) may encounter while attached to an asset. However, those of skill in the art will appreciate that other shapes may be used with the present invention while remaining within the scope of the claims herein.

Those of skill in the art will further appreciate that assets may have tags (10) attached by any convenient means, such as, adhesive, ties, screws, bolts, pins, or welds. More over tags (10) may or may not require an enclosure (40) as shown in FIG. 3, depending on the application of the present invention.

Referring again to FIG. 1, the system ideally further comprises a plurality of transponder antennas (20). Transponder Antennas (20) are attached to walls/ceilings of vehicles, warehouses, or any other location were Tags (10) are to be detected. More than one Transponder Antenna (20) can be used at a single location to increase the Tag (10) detection range. Thus, each transponder antenna (20) is at a known physical location, generally a place where assets (10) are in use, i.e. a job site. Each tag (10) is in wireless communication with the transponder antennas (20). The transponder antennas (20) are in electronic communication (wired or wireless) with a transponder base (30) located at a job site.

The Transponder Antenna (20) communicates with the Transponder Antenna (20) CPU via a serial link. The Tags can report more than one beacon per reporting interval. Currently, the Tags will send a "burst" of up to 3 identical beacons. If possible, the transponder antenna (20) CPU will need to filter these extra beacons and only send one to the rest of the Transponder Antenna unit.

Referring still to FIG. 1, the system of the present invention further comprises transponder base (30), which includes a central processing unit (CPU) configured to filter data received from the transponder antennas (20). The transponder base (30) is ideally remotely located from said transponder antenna (20) and comprises software suitable for filtering data from the transponder antennas (20). The transponder base (30) CPU software is configured to determine the presence or absence of tags at a job site.

Figure 2:
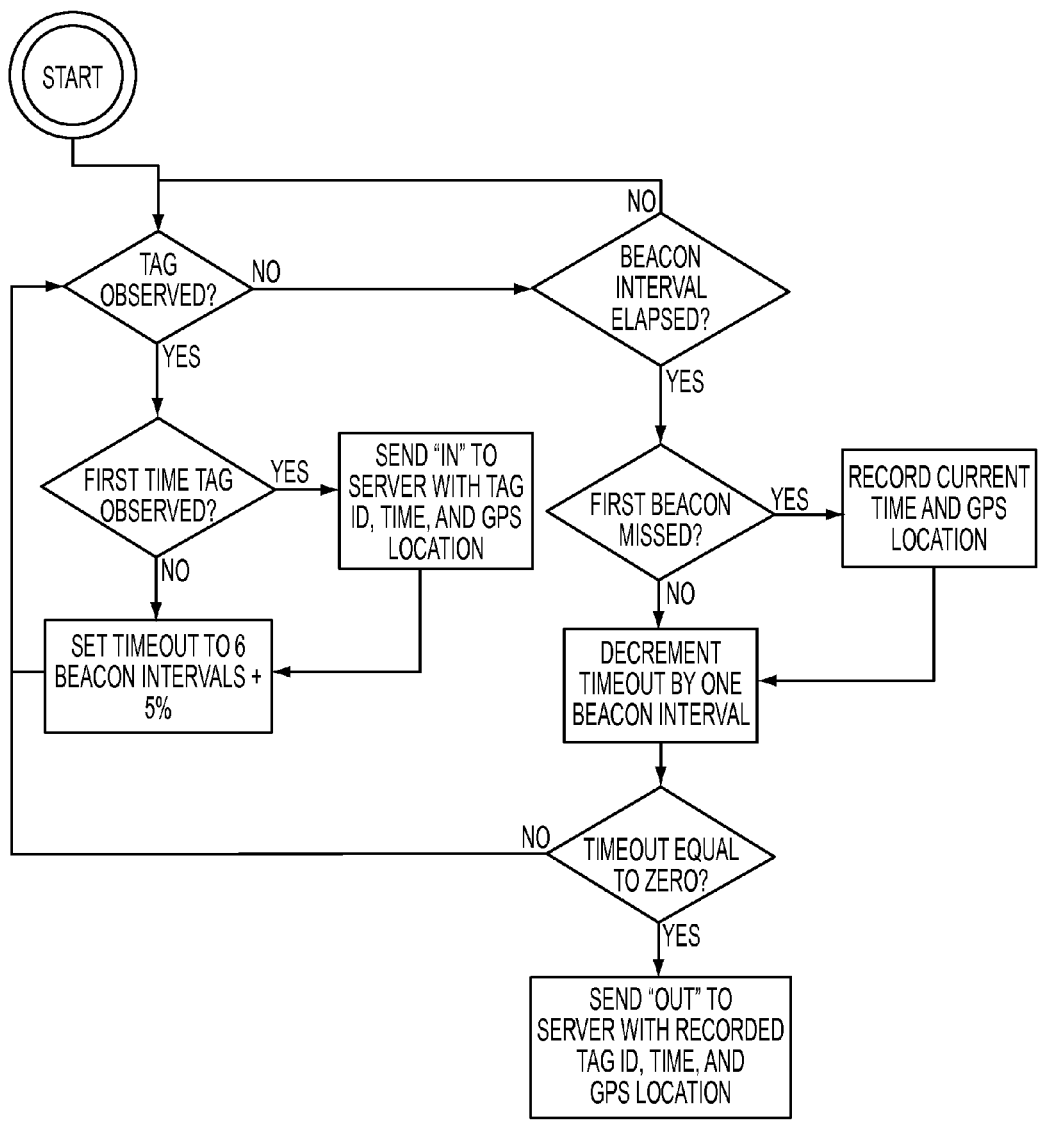
FIG. 2 is a functional block diagram illustrating the filtering software of the present invention.

FIG. 2 shows an exemplary flow chart of the software used in filtering the data collected by present system. The flow chart of FIG. 2, can be executed using any convenient computer language and hardware.

Referring again to FIG. 1, the transponder base (30) is wirelessly connected to the Internet via cellular connection or satellite connection to a cloud based server. The transponder base (30) preferably further includes GPS location means to track asset tags (10).

The server, in the preferred embodiment, includes software configured to compare the tagged assets to various useful databases of information. For example, the server may include asset maintenance schedules, asset use information, information about which job sites require certain assets, and information about scheduling of assets at a job site. This information can be provided by the server to human readable devices for users or providers of the present invention.

It should be understood that the above description is of a preferred embodiment and included for illustrative purposes only, and it is not meant to be limiting of the invention. A person skilled in the art will understand that variations of this invention are included within the scope of the claims.

The invention claimed is:

1. An automated system for tracking at least one asset within a physical space and reporting data about the asset location to a user, the system comprises: (a) an asset tag affixed to each of the plurality of assets, each asset tag comprising a unique identification beacon for the asset with which the asset tag is associated, the asset tag configured to communicate though one or more transponder antennas to a transponder base having a central processor programmed for filtering data from said plurality of tags to accurately determine the presence or absence of a tag within a predetermined space; (b) the central processor further programmed to identify tags by asset owner; (c) a data base for storing asset information for a plurality of assets, said database comprising a list of preselected suggested asset types for a plurality of predetermined task types the database being in communication with the central processor, wherein the asset information comprises at least information relating to location, ownership, maintenance and repair of the plurality of assets; (d) tracking software associated with the central processor, the tracking software configured to track a location of each of the plurality of assets, said software further configured to compare said list of predetermined suggested asset types with the assets within said predetermined space and communicate any differences between said list and said asset to at least one human readable device; (e) the central processor in wireless communication with said at least one human readable device and configured to electronically report information to said device, said information selected from the group consisting of asset usage, asset location, asset movement, asset ownership, and asset presence within a job site.

2. The system of claim 1, wherein the tracking software is configured to track movement of any of the plurality of assets into or out of any of the plurality of distributed sites based on information collected by the at least one transponder base from the asset tag of any asset being moved.

3. The system of claim 1, wherein the tracking software is configured to update the asset information of any one of the plurality of assets based on movement of the asset into or out of any of the plurality of distributed sites.

4. The system of claim 1, further comprising notification software associated with the central processor, the notification software configured to transmit a notification message to a user based on movement of an asset.

5. The system of claim 1, wherein the notification software is configured to prompt the user to confirm that the movement of the asset is authorized.

6. The system of claim 1, wherein the notification on message comprises information regarding transport of the asset to the user, wherein the notification software is further configured to prompt the user to confirm receipt of the asset.

7. The system of claim 1, further comprising a client processor in communication with the central processor through the computer network, wherein the client processor is configured to allow the user to input, query, and download asset information from the central processor.

* * * * *

UNITED STATES PATENT AND TRADEMARK OFFICE
CERTIFICATE OF CORRECTION

PATENT NO. : 9,462,357 B2  
APPLICATION NO. : 14/024033  
DATED : October 4, 2016  
INVENTOR(S) : Michael Westick et al.

Page 1 of 1

It is certified that error appears in the above-identified patent and that said Letters Patent is hereby corrected as shown below:

On the Title Page

Item (12) should read: Westick et al.

In the Inventor section, amend Inventor information as follows:
(72) Inventors: Michael Westrick, Huntertown, IN (US)
Nathan Robert Hoch, Fort Wayne, IN (US)
Christopher Michael Hogan, Fort Wayne, IN (US)
Atwell Richard Shearer, Fort Wayne, IN (US)

Signed and Sealed this
Eleventh Day of March, 2025

Coke Morgan Stewart
*Acting Director of the United States Patent and Trademark Office*